April 8, 1930.  W. D. GRANT  1,753,511
SUBAQUATIC DRILL
Filed April 13, 1927
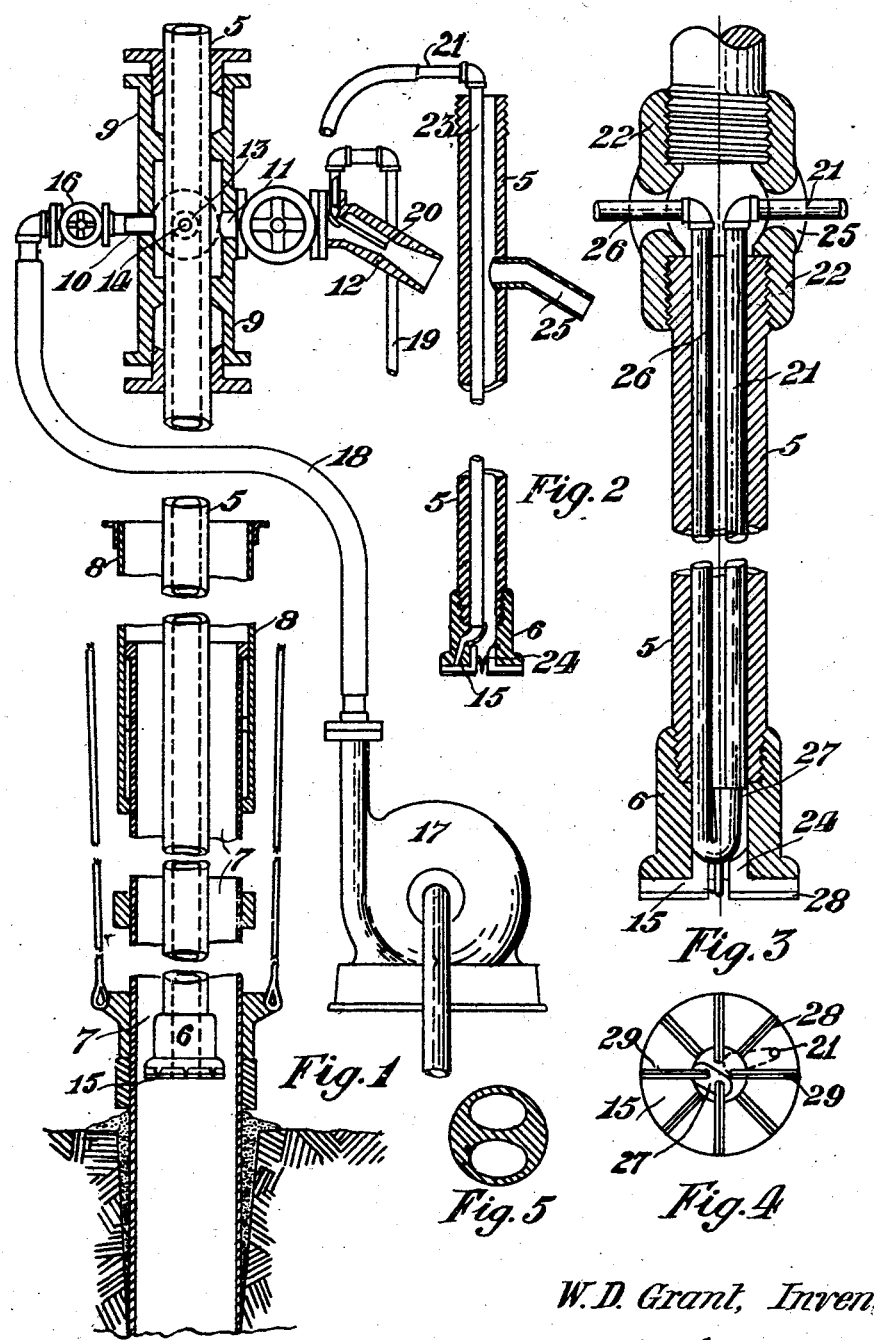
W. D. Grant, Inventor.
by J. L. Boyden, Attorney.

Patented Apr. 8, 1930

1,753,511

UNITED STATES PATENT OFFICE

WILLIAM DUNCAN GRANT, OF VANCOUVER, BRITISH COLUMBIA, CANADA

SUBAQUATIC DRILL

Application filed April 13, 1927. Serial No. 183,567.

This invention relates to a subaquatic drill of that class exemplified in Letters Patent No. 1,517,556 bearing date December 2, 1924, wherein the drill head is secured to the lower end of a relatively heavy tubular drill rod, which is lifted and allowed to fall, or is driven down, and by the momentum of its downward movement effects the cutting of the rock or other material in which it is required to drill.

As at present practised, a tubular casing encloses the drill tube to above water level and water under pressure is delivered to the drill through the centre of the drill tube and flows upward through the drill hole and through the casing, which rests on the upper edge of the drill hole, to be delivered through apertures in the casing tube a short distance above its lower end.

While this water flow is quite effective in carrying out the detritus from the drill while working in certain material, it is not sufficient to properly carry away fragments of rock under certain conditions and involving other material.

In the drill, which is the subject of this application, I convey the water to the drill end, either through the casing and drill hole or through the hollow drill rod or through a separate pipe, or a separate duct in the drill tube, and deliver the water with the detritus from the drill upward through the hollow of the drill tube where the cross sectional area being less than that between the drill rod and its casing, the flow is strong enough to carry rock fragments with it to or towards the surface where they are discharged.

It is necessary that the casing makes a tight joint at the upper edge of the drill hole and the hole at this point is generally of enlarged diameter and tapering before the drill has found its own centre and into this tapering hole the casing telescopically drops from one to six feet and seals itself, and this prevents any material or detritus from flowing back into the hole. A hole or holes are left in the casing at such a height above ground as may be judged to be sufficient to take care of the detritus that may be discharged from the hole.

In delivering water to the drill head I make use of a glandular water-box through which the drill rod passes, and that portion of the drill rod operating in the water-box is pierced with holes equidistant around its outer periphery to permit of water entering the drill rod.

On some work it is necessary to use a special drill steel with two internal ducts and two water-boxes, one box mounted above another, each water-box registering with ports or holes in the drill rod to one of the internal ducts. Such an arrangement is necessary when drilling in ground where it is necessary to carry on continuous jetting operations at the drill head and continuous suction.

To further facilitate the removal of the detritus I induce either in a steady operation or intermittently an upward flow of water through the drill rod by connecting the upper end to a source of vacuum, or by applying what is known as a siphon ejector to the delivery from the upper end of the drill tube, or preferably by applying the siphon ejector to the lower end of the drill tube close to the drill end, or by a duct within the hollow drill rod having an inverted end orifice near the drill face so that water under pressure may be brought to the lower end of the drill rod and discharged in an upward direction, so creating a vacuum condition and thereby disturbing the detritus settled there which is put in motion with the upward flow.

The particular means by which these several ideas are carried into practical effect are fully set forth in the following specification, reference being made to the drawings by which it is accompanied, in which:

Fig. 1 is a longitudinal sectional elevation of my drill rod, casing, water-box (or glandular chamber) giving suitable access to the interior of the drill rod, together with the other accessories in connection.

Fig. 2 is a similar view of the drill rod and one internal duct, and delivery outlet direct from the rod.

Fig. 3 is a similar view of the drill rod with two internal ducts.

Fig. 4 is a plan of one of the drill faces which I employ in connection with the various devices.

Fig. 5 is a section of the special drill rod formed with a double duct.

In these drawings 2 represents a relatively heavy drill tube having a drill head 6 removably connected to its lower end. The central portion of this head is apertured to correspond approximately with the bore of the tube 5 and the cutting edges of the drill project beyond both the outer and the inner diameter of the drill tube.

This drill tube 5 is longitudinally reciprocated by any suitable means, preferably by direct connection of it to the rod of a piston in a steam cylinder, in the manner usual with rock drills.

Surrounding this rod 5 below water is a casing tube 7, which is telescopically slidable in an upper length 8 extending to above water.

The lower end of the casing tube 7 is adapted to make a close joint on the ground around the drill hole. A water-box (or glandular chamber) 9 surrounds the drill rod and is gland-packed to meet the required pressure.

The outer wall of the water-box 9 is pierced by three orifices each closable by a stop valve as shown. One of these 10 is for water under pressure, another 11 for the vacuum ejector 12, and the third 13 for attachment to a vacuum pump.

Connection between the interior of the water-box and the interior of the drill rod is by one or more holes 14 preferably three in number. Water under pressure is delivered at 10 and flows down through the tubular drill rod to the drill face 15 emerging through the drilled hole into the casing 7 and thence escaping over the top edge, or being withdrawn by the action of the vacuum condition through either of the orifices 11 or 13, the inflow through 10 being meanwhile cut off at the valve 16, the operation in the latter case being of an intermittent character and is efficacious when the drill is working in heavy material causing rapid clogging of the outflow apertures. A suitable power pump is indicated at 17 united by the flexible connection 18 to the water inlet valve 16.

The vacuum ejector 12 is supplied with suitable fluid pressure through the pipe 19 connected with the jet nozzle 20.

Figure 2 indicates an arrangement in which the water-box 9 is dispensed with, water under pressure being delivered (through the duct 21 at an opening in the drill rod permitted by a pierced coupling as shown at 22 in Fig. 3 on other suitable devices) through the drill head by the duct 23 to the drill face 15 whence it flows back through the central aperture 24 up through the hollow drill rod to emerge at the outlet 25.

Figure 3 shows my method of water jetting the cutting face intermittently with a sluicing operation, in which water under pressure is delivered through a duct 21 to adjacently of the drill face 15 and at intervals depending upon the character of the work, sluicing away the detritus by the delivery of water under pressure through the duct 26 to and through the upturned jet 27 whereby through the kinetic action of the upward water flow, a vacuum condition is set up in the vicinity of the drill face 15 disturbing the cuttings and causing the same to be carried away by the flow.

Under circumstances demanding the sluicing operation to be carried on simultaneously with the working of the drill rod an interrupted coupling of the general type shown at 22 in Figure 3 would be unsuitable and would need to be used in connection with a gland-packed water-box of the type shown at 9 in Figure 1, but where the two ducts are in use a double chambered water-box will, of course, be essential, both in the case of removable conduits such as 26 and 21 and also in the case of using the hollow drill rod shown in Figure 5 with the duplex bore.

Figure 4 is a plan of the drill face 15 showing my method of arranging the cutters 28. It is to be noted that these cutters, in this case eight, allow ample clearance for the discharge of the cuttings, and that alternate ones 29 project inwardly beyond the central aperture 24 for the purpose of reducing any larger pieces of rock which may escape the cutting action before being forced up the central aperture. These inwardly projecting portions are materially strengthened by the curved web on each side of each projecting cutter formed by piercing a lateral web by the circular holes shown in Figure 4.

Having now particularly described my invention, what I claim as new and desire to be protected in by Letters Patent, is:—

In a subaquatic drill the combination with a tubular drill rod to which an endwise reciprocating movement is imparted and to the lower end of which drill rod the drill head is secured, of two longitudinal ducts within the longitudinal aperture of the said drill rod and extending from the drill head to above water level, one of said ducts jetting water under pressure to adjacent the cutting face of said drill head, and the other said duct terminating in an upturned orifice adjacent the head of the drill, the said upturned orifice being adapted to deliver water under pressure upwards from the bottom end of the said drill rod whereby the efficiency of the upward water flow carrying the detritus from the vicinity of the cutting face may be improved.

In testimony whereof I affix my signature.

WILLIAM DUNCAN GRANT.